Dec. 7, 1954  H. H. MERRIMAN  2,696,408
BALANCE WEIGHT FOR AUTOMOBILE WHEELS
Filed Aug. 10, 1949
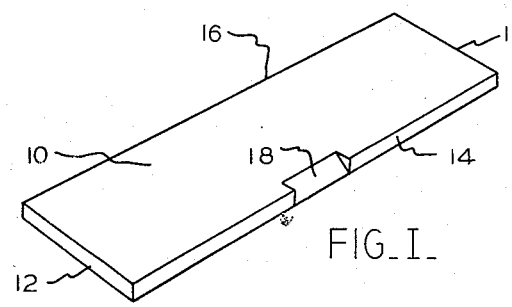
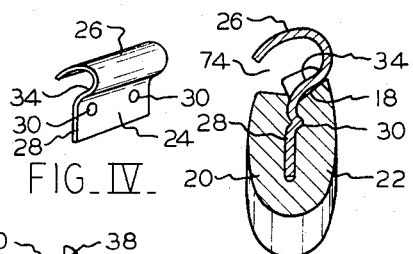
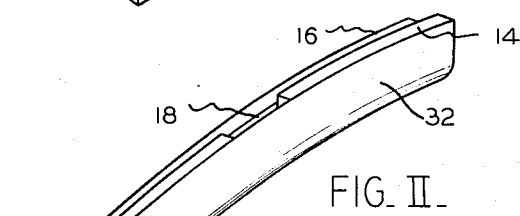
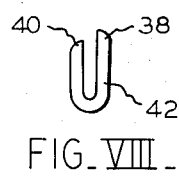
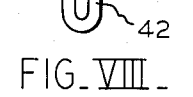
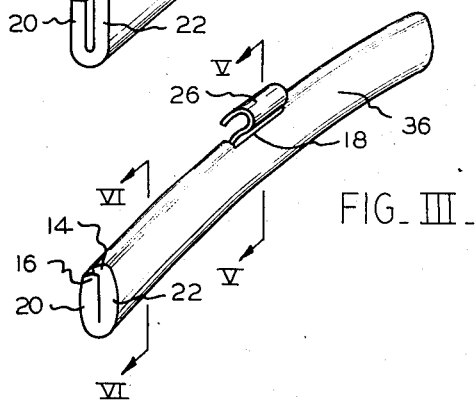
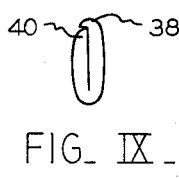
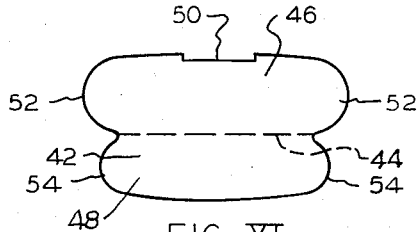
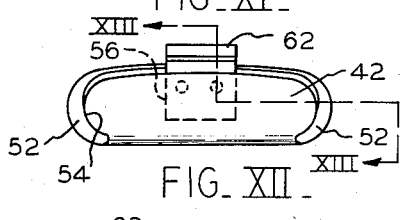
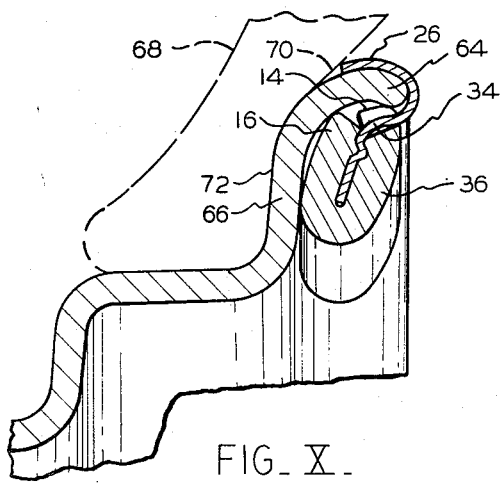
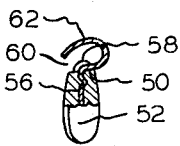
Inventor
HENRY H. MERRIMAN
By Beaman & Patch
ATTORNEYS

United States Patent Office 2,696,408
Patented Dec. 7, 1954

2,696,408

BALANCE WEIGHT FOR AUTOMOBILE WHEELS

Henry H. Merriman, Jackson, Mich.

Application August 10, 1949, Serial No. 109,536

3 Claims. (Cl. 301—5)

The present invention relates to improvements in the manufacture of balance weights for automobile wheels and the like of the type attached to the tire retaining flange of the wheel by a resilient clip as more fully disclosed in the patent of James W. Hume, No. 2,036,757, granted April 7, 1936.

It has been the general practice heretofore to cast the body portion of the balance weight upon a portion of the clip as disclosed in the Du Sang Patent No. 2,029,561; the cast body usually comprised of lead and antimony. While such material has the advantage of having a relatively high specific gravity, it is relatively expensive as compared with steel.

While it has been proposed to use steel and iron weight bodies held in position on the tire retaining flange by a spring steel clip, in such devices that have appeared upon the market the assembly between the weight body and clip has not been permanent nor has the form of the weight body been well adapted to the rim contour. Also, the shape of the steel and iron weight bodies have been such as to interfere with ornamental wheel trim in the form of ornamentally plated rims, oversized hub caps and the like.

The present invention provides a balance weight for automobile wheels of the type described from steel strips in sizes varying from one-half ounce to five ounces for passenger cars and substantially larger sizes for trucks and buses. Sheets of steel of the proper gauge are preferably folded upon the spring clip and then the assembly formed to the proper contour to fit the tire retaining flange and at the same time to hold the clip in its assembled position in the steel strip.

Thus one of the objects of the present invention is to provide an improved steel balance weight for automobile wheels and the like.

Another object is to provide an inexpensive balance weight for automobile wheels of strip steel material which in its final form will resemble a die-cast or molded weight in appearance.

Another object is to provide a balance weight of the type described in which the resilient clip is held in position by means compressed between layers of materials making up the body of the weight.

A further object of the invention is to provide an all steel balance weight having a resilient steel clip and a stripped steel body folded on a portion of the clip to assemble the clip to the body.

A still further object of the invention is to provide an improved balance weight of the type described designed to be attached to the peripheral edge of the tire retaining flange solely by resilient tension of the clip.

A still further object of the invention is to provide a balance weight of the type described in which the portion of the resilient spring clip which engages with the peripheral portion of the tire retaining flange of the automobile wheel conforms substantially to the exposed peripheral portion of the rim located outwardly from the side wall of the pneumatic tire.

These and other objects and advantages residing in the present invention will be more fully appreciated from a consideration of the following specification and the appended claims.

In the drawings:

Fig. I is a perspective view of a strip of steel or other suitable material stamped from a larger sheet or sheared from strip or coil stock, Fig. II is a perspective view of the blank strip material shown in Fig. I folded in position to receive the spring clip, Fig. III is a perspective view of a finished balance weight showing the clip and strip material assembled and following the forming operation, Fig. IV is a perspective view of one form of the spring clip in the assembly of Fig. III, Fig. V is a cross sectional view of the balance weight taken on line V—V of Fig. III, Fig. VI is a view similar to Fig. V taken on line VI—VI of Fig. III, Fig. VII is a view similar to Fig. I showing the use of mill edged strip stock, Fig. VIII corresponds to Fig. II and shows the mill edged stock of Fig. VII in its folded position ready to receive the clip, Fig. IX shows an end view of the balance weight indicating the manner in which the milled edge strip is folded and formed in the finished article, Fig. X is a fragmentary cross-sectional view through an automobile rim and pneumatic tire showing the relationship between the balance weight and clip with respect to the peripheral edge of the rim and the side wall of the tire, Fig. XI is a plan view of a blank, preferably stamped from steel sheet or strip stock, Fig. XII is a plan view showing the blank of Fig. XI folded upon itself and formed to hold the clip in position, and Fig. XIII is a cross-sectional view taken on line XIII—XIII of Fig. XII.

Referring to the drawings, in Fig. I is shown a blank 10 which may be economically sheared or punched from scrap sheet or strip material in view of the fact that the blank is approximately an inch wide and will range in length from approximately one to six inches over the normal range of passenger car weights. Obviously the length of the blank 10 will vary with the width and thickness of the stock. In practice, eight to ten gauge stock has been found satisfactory from the standpoint of forming a weight which will substantially nest within the flare of the tire retaining flange to avoid interference with present day ornamental rim trim when used on the outside of the wheel and will not interfere with the turning radius when used on the inside of the wheel.

The ends 12 of the blank 10 are preferably at 90° to the edges 14 and 16 and provide a substantial shoulder at each end of the finished weight to facilitate the driving of the weight around the circumference of the tire retaining flange during the balancing of the wheel. At the time the blank 10 is sheared, punched or otherwise fabricated to length, an angular clip notch 18 may be conveniently punched or coined in the edge 14.

In Fig. 2, the blank 10 is shown folded into a U-shaped channel with the leg 20 being preferably slightly shorter than the leg 22 in which the clip notch 18 is located. Except for the smaller size weights, the channel of Fig. II is formed with a longitudinally extending curvature corresponding substantially to the circumferential curvature of the tire retaining flange at the point at which the weight is attached.

The clip 24 is fabricated from spring steel with a flange embracing portion 26 and an extension end 28 in which projections 30 are preferably formed to assist in anchoring the clip 24 in the assembly. At the time the clip 24 is assembled in the folded channel 32 of Fig. II, the end 28 is disposed between the legs 20 and 22 and the angular portion 34 of the portion 26 is in registry with the notch 18. Sufficient pressure is then applied to the loosely assembled parts to collapse the folded channel 32 upon the clip 24. This step may be carried out in suitable dies in a punch press with the pressure being adequate to force some of the material of the legs 20 and 22 into interlocking engagement with the projection 30 to rigidly hold the clip 24 in position.

To similate the appearance of the die cast weight now in extensive use, the edge 14 is shown rolled over the edge 16 through the length of the finished weight 36 of Fig. III upon opposite sides of the notch 18.

As more clearly shown in Fig. V, the angularity of the notch 18 is preferably slightly greater than that of the portion 34 of the clip 24. Also, the notch 18 is shown sufficiently deep to extend below the edge 16 of the shorter leg 20 of the channel 32. With this arrangement, the pressure exerted upon the end 28 of the clip 24 will always tend to hold the clip 24 positioned against the angular wall of the notch 18.

In Fig. VII a modified form of the invention is illustrated, in which the channel 32 of Fig. II is fabricated from a strip of steel, preferably coiled at the mill and provided with rolled edges 38 and 40 to give an improved appearance to the finished weight and to facilitate the forming of the finished assembly. In Fig. VIII the manner in which the strip shown in Fig. VII is folded is indicated to provide a channel 42 corresponding to the channel 32 of Fig. II. In Fig. IX the manner in which the rolled edges 38 and 40 are formed in the final operation is illustrated.

In Figs. XI, XII and XIII is shown a modified form of the blank 10 of Fig. I wherein the shape of the blank is such as to provide a weight having rounded ends and a more streamlined appearance. As shown in Fig. XI, the blank 42 is stamped out in suitable dies from sheet or strip material, preferably of steel. The fold line of the blank 42 is indicated by the dotted line 44 which divides the blank 42 into two substantially complementary leg portions 46 and 48. The clip notch 50 is shown provided in the portion 46 with all the material being removed from the strip in the locality of the notch 50 as distinguished from the angular notch 18 of Fig. I. Both the leg portions 46 and 48 are shown with rounded end portions 52 and 54 with the length and width of the leg portions 48 being slightly less than the leg portion 46.

In practice, the blank 42 is folded upon the line 44 to provide a channel corresponding to the channel 32 of Fig. II. The clip 56 is then assembled within the channel formed by the blank 42 and rigidly held in position by the final forming and shaping operation which when carried out with the proper dies in a punch press makes it possible with the blank 42 shaped as shown to roll the edge portions of the leg 46 around and into the plane of the edge portion of the leg 48. By rolling the edge portion of the leg 46 over the edge portion of the leg 48 in the manner just described, the resulting balance weight when in position upon the tire retaining flange of an automobile wheel has the appearance of being of die cast construction especially when viewed from the ends as the fold line which appears at the ends of the form of the invention shown in Fig. III has been substantially eliminated.

As more clearly shown in Fig. XIII, the clip 56 is formed with a portion 58 so shaped as to be substantially flush in the notch 50. In this manner, the notch 50 can be employed to locate the clip 56 in position in the channel formed by the blank 42 prior to final forming operation with the result that the opening 60 between the main body of the weight and the overhanging lip portion 62 of the clip 56 can be uniformly maintained.

In Fig. X, the weight 36 in the final form is shown applied to the peripheral edge portion 64 of the tire retaining flange 66 of the wheel rim on which the pneumatic tire 68 is mounted, all in a well-known manner. It will be noted that the portion 26 of the clip 24 is so designed as to engage only with the peripheral edge portion of the flange 36 and in practice will not extend any appreciable extent between the outer wall 70 of the tire 68 and the inner wall 72 of the flange 66.

At the present time passenger car rims have a thickness at the peripheral edge portion 64 in the order of .115 to .125 inch. By providing a restricted throat opening between the portion 26 of the clip 24 and the upper edge of the weight 36 in the order of .090 to .110 inch, a balance weight is provided which may be generally applied to all passenger car rims now in use and when sprung into position over the peripheral edge portion 64 of the rim 66, it may be satisfactorily held in position solely by the tension of the spring clip 24. At the same time, the relatively short over-hanging lip 26 of the clip 24 permits the leg portions 20 and 22 to be received between the forming dies to assemble the clip 24 to the channel 32 without interference that would otherwise result if the portion 26 overlapped the side of the leg 20 which abuts the flange 66 as has been the practice heretofore.

The form of the invention illustrated in Figs. I to VI inclusive has the advantage that the various sizes of weights may be fabricated with a minimum of fixtures, tools and dies. The blank shown in Fig. I may be sheared to the desired length from strip stock of the same width. The same set of dies may be used to form the channel 32 of the various sizes. This is also true with respect to the dies for the final form 36.

While the form of the invention illustrated in Figs. XI, XII and XIII may be economically fabricated from scrap strip and sheet material of various lengths and widths, it has the disadvantage that different sets of dies would be required for each size of weight.

In practice, it is found that a balance weight may be manufactured according to the present invention with a great accuracy as compared with die-cast weights which are often underweight due to blow holes and other defects. By providing an inter-lock between the legs 20 and 22 and the projection 30 of the clip 24, the clip 24 is rigidly held in position. At the same time the location of the projections 30 as shown, enables the use of a minimum of pressure to provide a maximum inter-lock between the assembled parts.

In the claims the leg 20 is described as the flange side leg as it is directly adjacent the tire retaining flange as shown in Fig. X. Also, it will be noted that the restricted throat 60 is generally disposed in the plane of the same leg 20.

Having thus described my invention, what I claim as new and novel and desire to cover by Letters Patent is:

1. A balance weight for automobile wheels of the type described comprising a longitudinal strip of metal folded longitudinally on itself, the leg portions constituting the fold of said body being of unequal length with the longer leg portion being turned over the peripheral edge of the shorter leg portion, an attachment clip having one end disposed in the fold of said body and its outer end shaped to define a restricted throat with a peripheral edge of said shorter leg portion, said longer leg portion being notched at the peripheral edge to provide clearance for said clip at a point at which it emerges from the fold of the said body.

2. A balance weight for automobile wheels of the type described resiliently attached to the peripheral edge of the tire retaining flange comprising a main body of malleable material folded upon itself to provide substantially parallel leg portions, a resilient clip of thin metal strip having a relatively straight leg portion and a curved attachment portion, the leg portion of said clip being disposed between the body leg portions in substantial parallelism therewith, said curved portion being disposed outside of said body and being returned bent in respect to the leg portion of said clip to define a restricted resilient throat receiving the peripheral edge of said flange, said leg portions being of unequal length with said restricted throat being disposed to the side of said body defined by the leg portion of lesser length.

3. A balance weight for automobile wheels of the type described resiliently attached to the peripheral edge of the tire retaining flange comprising a main body of malleable material folded upon itself to provide substantially parallel leg portions, a resilient clip of thin metal strip having a relatively straight leg portion and a curved attachment portion, the leg portion of said clip being disposed between the body leg portions in substantial parallelism therewith, said curved portion being disposed outside of said body and being returned bent in respect to the leg portion of said clip to define a restricted resilient throat receiving the peripheral edge of said flange, said leg portions being of unequal length with said restricted throat being disposed to the side of said body defined by the leg portion of lesser length, said leg of greater length being provided with a peripheral notch to provide clearance for said clip.

References Cited in the file of this patent

UNITED STATES PATENTS

| Number | Name | Date |
| --- | --- | --- |
| 1,490,772 | Gunn | Apr. 15, 1924 |
| 2,029,561 | DuSang | Feb. 4, 1936 |
| 2,122,065 | Hume | June 28, 1936 |
| 2,137,415 | Rubsam | Nov. 22, 1938 |
| 2,177,861 | Burger | Oct. 31, 1939 |
| 2,221,747 | Turner | Nov. 19, 1940 |
| 2,336,920 | Beaman | Dec. 14, 1943 |
| 2,469,997 | Simpson | May 10, 1949 |